US009146168B1

(12) United States Patent
Mee et al.

(10) Patent No.: US 9,146,168 B1
(45) Date of Patent: Sep. 29, 2015

(54) PRESSURE SENSOR

(71) Applicant: Consolidated Nuclear Security, LLC, Reston, VA (US)

(72) Inventors: David K. Mee, Knoxville, TN (US); Edward B. Ripley, Knoxville, TN (US); Zachary C. Nienstedt, Oak Ridge, TN (US); Alex W. Nienstedt, Oak Ridge, TN (US); Layton N. Howell, Jr., Knoxville, TN (US)

(73) Assignee: Consolidated Nuclear Security, LLC, Reston, VA (US)

( * ) Notice: Subject to any disclaimer, the term of this patent is extended or adjusted under 35 U.S.C. 154(b) by 179 days.

(21) Appl. No.: 13/835,700

(22) Filed: Mar. 15, 2013

(51) Int. Cl.
G01L 7/00 (2006.01)
G01L 7/06 (2006.01)
G01L 7/08 (2006.01)
G01L 5/00 (2006.01)

(52) U.S. Cl.
CPC ............ G01L 7/06 (2013.01); G01L 5/0042 (2013.01); G01L 7/08 (2013.01)

(58) Field of Classification Search
None
See application file for complete search history.

(56) References Cited

U.S. PATENT DOCUMENTS

| | | | | |
|---|---|---|---|---|
| 3,703,681 A | * | 11/1972 | Johnson et al. | 324/249 |
| 4,591,788 A | * | 5/1986 | Mohri et al. | 324/260 |
| 4,772,813 A | * | 9/1988 | Mohri et al. | 310/26 |
| 5,146,790 A | * | 9/1992 | Fish | 73/862.336 |
| 5,707,753 A | * | 1/1998 | Kurihara et al. | 428/611 |
| 5,850,045 A | * | 12/1998 | Harada et al. | 73/862.333 |
| 6,176,943 B1 | * | 1/2001 | Wun-Fogle et al. | 148/108 |
| 6,270,591 B2 | * | 8/2001 | Chiriac et al. | 148/300 |
| 6,393,921 B1 | * | 5/2002 | Grimes et al. | 73/728 |
| 7,261,005 B2 | | 8/2007 | Bunyer et al. | |
| 2005/0268721 A1 | * | 12/2005 | Rudkin | 73/702 |

FOREIGN PATENT DOCUMENTS

ES          2021539 A6  *  11/1991

OTHER PUBLICATIONS

C. A. Grimes, et al.; Wireless Magnetoelastic Resonance Sensors: A Critical Review; Sensors, 2002, pp. 294-313.
E.E. Mitchell, et al.; A New Metglas Sensor: IEEE Transactions on Idustrial Electronics, IE-33, May 1986.
C.A. Grimes, et al.; "Magnetoelastic Sensors in Combination with Nonometer-scale Honeycombed Thin Film Ceramic TiO2 for Remote Query Measurement of Humidity"; Journal of Applied Physics, 87.

(Continued)

Primary Examiner — Andre Allen
(74) Attorney, Agent, or Firm — Michael J. Renner, Esq.; Luedeka Neely Group, P.C.

(57) ABSTRACT

Disclosed is a passive, in-situ pressure sensor. The sensor includes a sensing element having a ferromagnetic metal and a tension inducing mechanism coupled to the ferromagnetic metal. The tension inducing mechanism is operable to change a tensile stress upon the ferromagnetic metal based on a change in pressure in the sensing element. Changes in pressure are detected based on changes in the magnetic switching characteristics of the ferromagnetic metal when subjected to an alternating magnetic field caused by the change in the tensile stress. The sensing element is embeddable in a closed system for detecting pressure changes without the need for any penetrations of the system for power or data acquisition by detecting changes in the magnetic switching characteristics of the ferromagnetic metal caused by the tensile stress.

19 Claims, 7 Drawing Sheets

(56) References Cited

OTHER PUBLICATIONS

K.G. Ong, et al.; "A Wireless, Passive, Magnetically-soft Harmonic Sensor for Monitoring Sodium Hypochlorite Concentrations in Water"; Sensors 2003, pp. 11-18.

E.L. Tan, et al.; "Implantable Biosensors for Real-time Strain and Pressure Monitoring"; Sensors, 2008, pp. 6396-6406.

K. Mohri, et al.; "Advances of Amorphous Wire Magnetic over 27 Years"; Phys. Status Solidi A, 206, pp. 601-607, Feb. 2, 2009.

L.V. Panina, et al.; "Magneto-Impedance Effect in Amorphous Wires"; Aug. 29, 1994, Appl. Phys. Lett., 65, pp. 1189-1191.

Aichi Steel, 2001, "Aichi Steel Establishes Company to Develop Magnetic Impedance Sensors"; http://www.aichi-steel.co.jp/ENGLISH/TOPICS/topics140.htm.

M. Temneanu, et al.; "Amorphous Wire Based Stress Sensor Working With Low Carrier Frequency"; Nov. 27-30, 2007, IMEKO 20th TC3, 3rd TC16 and 1st TC22 International Conference, Merida Mexico.

L. Zhae, et al.; "Theoretical Studies on Amorphous Wire Sensor and its Application for AHRS"; May 30 to Jun. 1, 2007, IEEE International Conference on Control and Automation, Guangzhou, China.

H. Chiriac, et al.; "Amorphous Glass-Covered Magnetic Wires: Preparation, Properties, Applications"; Progress in Materials Science, 1996, 40, 333-407.

D.P. Makhnovskiy, et al.; "Chapter 11: Field and Stress-Tunable Microwave Composite Materials Based on Ferromagnetic Wires"; from Progress in Ferromagnetism Research, 2006, ed. V.N. Murray, Nova Science Publishers, Inc., New York.

\* cited by examiner

PRESSURE SENSOR

GOVERNMENT RIGHTS

The U.S. Government has rights to this invention pursuant to contract number DE-ACO5-000R22800 between the U.S. Department of Energy and Babcock & Wilcox Technical Services Y-12, LLC.

FIELD

This disclosure relates to the field of pressure sensors. More particularly, this disclosure relates to a sensing element that is embeddable in a closed system such as sealed waste containers for detecting pressure changes without the need for any penetrations of the system for power or data acquisition.

BACKGROUND

Closed and sealed objects such as shipping containers may gain or lose pressure due to a variety of factors. For example, a sealed container of waste material may gain pressure due to the biological and/or chemical make-up of the contents stored in the container along with such factors as time and temperature. It is often undesirable to penetrate the closed system for the purpose of determining or relieving pressure in the container. For example, it may be dangerous to open a sealed container in which the pressure has significantly increased or opening the container may otherwise damage the contents of the sealed container. What is needed therefore is an inexpensive, in-situ pressure sensing element that can be interrogated by a detection mechanism external to the object in which the sensing element is disposed.

SUMMARY

According to one embodiment of the disclosure, a pressure sensor is disclosed having a housing, a ferromagnetic metal disposed in the housing, a tension inducing mechanism coupled to the ferromagnetic metal, the tension inducing mechanism operable to change a tensile stress upon the ferromagnetic metal based on a change in pressure in the housing, and a twisting mechanism operable to twist the ferromagnetic metal in relation to the housing.

According to certain embodiments, the ferromagnetic metal is an amorphous wire. In some embodiments, the amorphous wire is melt extracted. In other embodiments, the amorphous wire is a glass coated Taylor wire. According to some embodiments, the amorphous wire is composed of a cobalt and iron based alloy.

According to certain embodiments, the tension inducing mechanism includes bellows. The twisting mechanism includes an insert sized and configured for insertion in a first end of the housing and operable to be rotated in relation to the housing, the ferromagnetic metal being secured to the insert such that the ferromagnetic metal is twisted when the insert is rotated. In some embodiments, the insert includes the tension inducing mechanism and a tapered adapter having a through-hole, the ferromagnetic metal being threaded through the through-hole of the tapered adapter and secured to the tension inducing mechanism. In some embodiments, the sensor further includes an axial load adjustment mechanism for providing manual adjustments of the tensile stress of the ferromagnetic metal.

According to certain embodiments, the sensor further includes a detection mechanism having an inducing mechanism to induce alternating magnetic domains in the ferromagnetic metal and a detection mechanism to detect changes in magnetic switching characteristics of the ferromagnetic metal caused by the inducing mechanism and changes in the tensile stress of the ferromagnetic metal caused by the change in pressure in the housing.

According to another embodiment of the disclosure, a method of determining pressure in a closed system is disclosed. The method includes providing a sensor element inside the closed system, the sensor element including a ferromagnetic metal and a tension inducing mechanism coupled to the ferromagnetic metal, the tension inducing mechanism operable to change a tensile stress upon the ferromagnetic metal based on a change in pressure in the closed system; subjecting the ferromagnetic metal to an alternating magnetic field; and detecting a change in magnetic switching characteristics of the ferromagnetic metal which varies as a function of tensile stress in the ferromagnetic metal.

According to certain embodiments, the subjecting the ferromagnetic metal to the alternating magnetic field and detecting the change in magnetic switching characteristics steps are performed by a detection mechanism disposed outside the closed system. Further, in certain embodiments, there is no wired connection between the sensor element and the detection mechanism during the subjecting the ferromagnetic metal to the alternating magnetic field and detecting a change in magnetic switching characteristics steps.

In some embodiments, the method further includes twisting the ferromagnetic metal in the sensor element, wherein the change in magnetic switching characteristics of the ferromagnetic metal varies as a function of tensile stress and twist in the ferromagnetic metal.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of pressure sensors. It is to be understood that other embodiments may be utilized, and that structural changes may be made and processes may vary in other embodiments.

Figure 1:
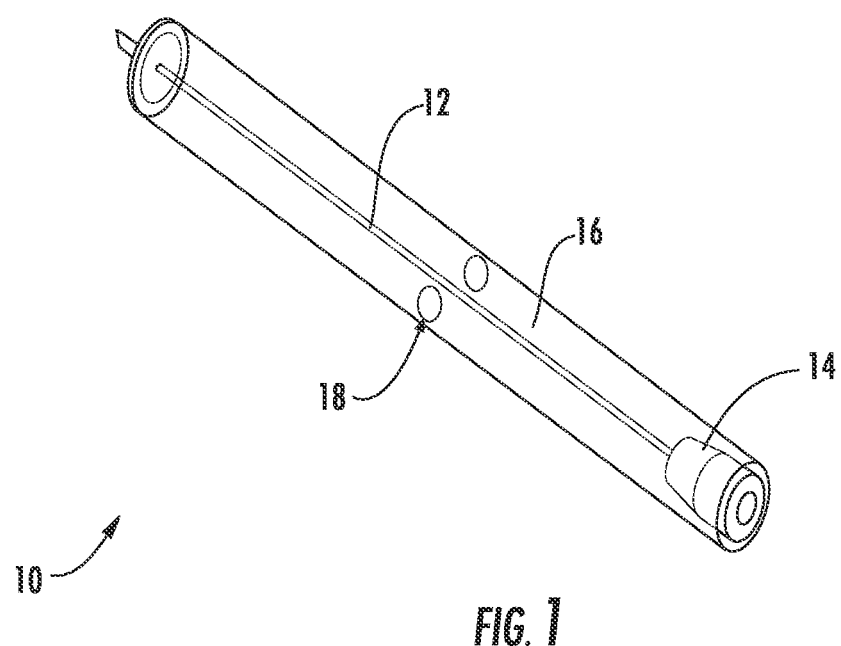
FIG. 1 depicts a sensing element having a magnetic wire coupled with pressure sensitive bellows according to one embodiment of the disclosure.

A pressure sensor of the present disclosure includes a sensing element that employs a ferromagnetic metal coupled to a tension inducing mechanism operable to change a tensile stress upon the ferromagnetic metal based on a change in pressure in the sensing element. Referring to FIG. 1, a simplified sensing element 10 is depicted where the ferromagnetic metal is configured as a wire 12 and the tension inducing mechanism is a sealed bellows chamber secured to one end of the wire 12. In operation, the pressure inside a housing 16 containing the metal wire 12 and bellows 14 equilibrates to the surrounding pressure through one or more vent holes 18 disposed in the housing 16. A pressure higher than that inside the bellows 14 causes the bellows 14 to contract, which places an axial tension on the metal wire 12. To detect changes in pressure, a detection mechanism preferably including a set of drive and pickup coils is placed in proximity to the sensing element 10. Alternating current in the drive coils creates a magnetic field which continually reverses the magnetic domains in the wire 12. Reversal of the magnetic domains is detected with the pickup coils. As tension is applied by the bellows 14 to the wire 12, the permeability of the wire 12 typically decreases and the domain switching slows. Thus, the sensing element 10 exploits the fact that, when subjected to alternating magnetic fields at a given amplitude and frequency, the magnetic field strength and switching speed of the magnetic wire 12 varies as a function of tensile stress in the wire 12.

Figure 2:
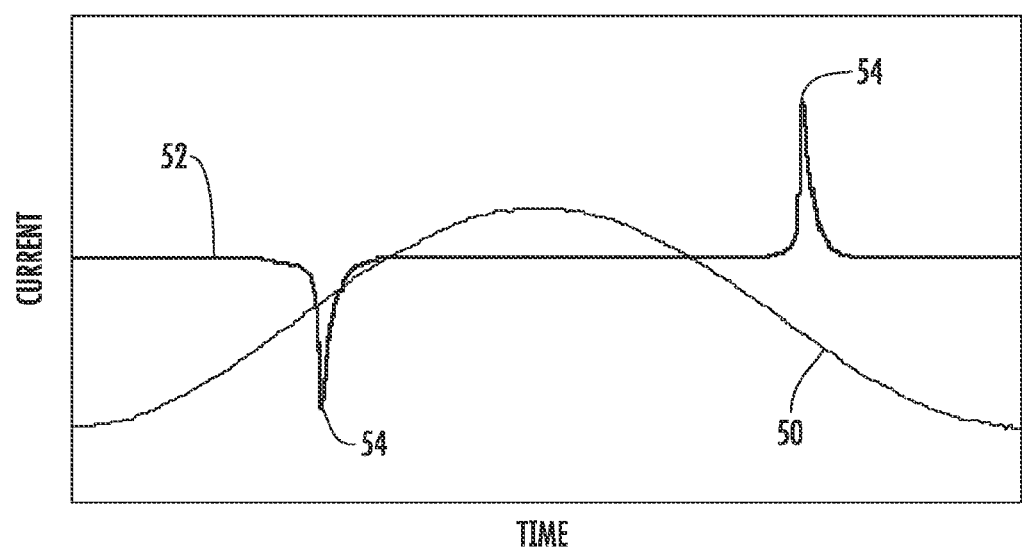
FIG. 2 depicts a time plot of a drive coil current compared to a pickup coil current having peak heights representing the strength of the detected magnetic domain switching of a sensing element.
Figure 3:
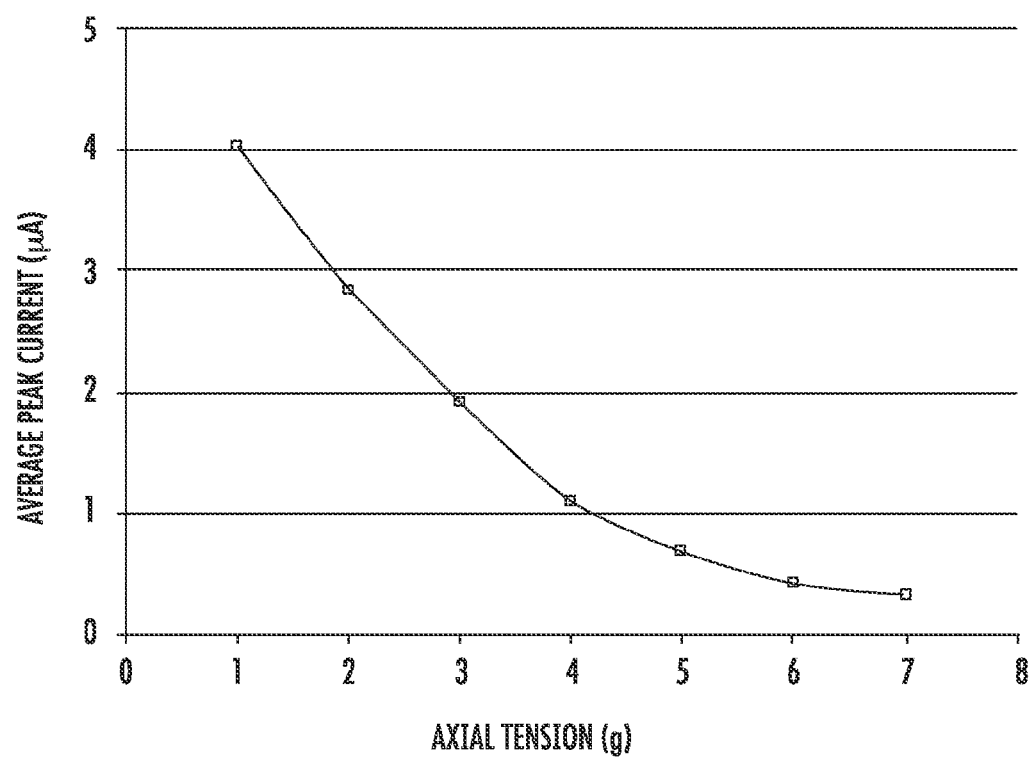
FIG. 3 depicts a graph of the relationship between peak height of the pickup coil current and axial tension applied to the magnetic wire of a sensing element.

Referring to FIGS. 2-3, the relationship between the height of the magnetic switching pulse generated in a pickup coil close to the magnetic wire 12 and changes in pressure in the housing 16 of the sensing element 10 is exemplified. A time plot of a drive coil current 50 compared to a pickup coil current 52 is shown in FIG. 2. The peak heights 54 of the pickup coil current 52 are dependent on the speed or strength at which the magnetic wire 12 domains reverse for a given drive current and frequency. As shown in FIG. 3, which shows the relationship between the average of the absolute value of the positive and negative peak heights 54 as axial tension is applied to a magnetic wire 12, the peak height 54 in the pickup coil current 52 decreases with the increase in axial tension of the wire 12. The peak heights 54 can then be correlated to pressure in the housing 16 of the sensing element 10 as the axial tension in the magnetic wire 12 is proportional to the pressure acting on the bellows 14.

Referring back to FIG. 1, the tension inducing bellows 14 and ferromagnetic wire 12 are the two primary components of the sensing element 10 as described above. While various configurations and preferred components of the sensing element 10 are described below, it should be understood that other constructions of the sensing element 10 are possible and within the scope of the present disclosure.

In many applications, it is desired that the sensing element 10 is relatively small. In order to make a smaller sensing element 10, a small bellows 14 is required. As the bellows 14 generates a force proportional to its cross sectional area, ferromagnetic wire 12 with high sensitivity is needed to fabricate a sensing element 10 with ranges on the order of 1 atm or smaller. Such a metal wire 12 is preferably an amorphous wire constructed from a ferromagnetic-based alloy having one or more glass forming components. In preferred embodiments, the amorphous wire 12 is a Cobalt (Co) and Iron (Fe) based alloy such as $Co_{80.9}Fe_{4.4}Nb_{4.5}Si_{8.7}B_{1.5}$. In typical embodiments, the wire 12 will be about 20 to about 40 microns in diameter, and most preferably about 30 microns. However, the particular combination of components and dimensions of the wire can be tailored for specific applications and desired sensitivity.

The amorphous characteristic of the wire 12 is produced during the alloy casting operation by rapid cooling from the molten to solid state. As a result, the material has a disordered atomic-scale (noncrystalline) structure. This noncrystalline structure leads to a higher tensile strength than that of material with an orderly structure. Further, the amorphous wire 12 has high magnetic susceptibility with low coercivity and high electrical resistance. Thus, the magnetic domains of the wire 12 can be switched when subjected to very small alternating magnetic fields. In addition, the amorphous wire 12 magnetic domain switching properties are sensitive to stress. These properties of the amorphous magnetic wire 12 enable the sensing applications of the disclosed pressure sensor. Additionally, the amorphous wire 12 can be induced and interrogated remotely without physical connections making passive sensing of the sensing element 10 without penetration of closed system walls possible particularly when the walls have low magnetic permeability and low electrical conductivity.

The amorphous wire 12 is preferably made using a melt extraction process which forms the wire by passing a sharp spinning blade through a pool of molten alloy metal. Alternatively, the amorphous wire 12 could be made using the so-called Taylor process which forms the wire by drawing it from a molten glass vial containing the alloy metal. Wires 12 made from the two processes are quite distinctive from each other. The Taylor wire has a glass coating which melt extraction wire does not have. Glass-coated Taylor wire can also be wound in long lengths whereas melt extracted wire cannot be readily spooled and is generally only available in short lengths up to about 2 meters. In effect, melt extracted wire is less uniform than glass-coated Taylor wire, which can cause calibration differences between different sensing elements. However, despite the non-uniform dimension, one advantage of melt extracted wire over Taylor wire is that it has a greater sensitivity to tension which enables detection of smaller force changes without compromising the size of the sensing element 10 (i.e., the ability to detect smaller force changes enables use of smaller bellows). According to tests, sensitivity of the melt extracted wire is over three times greater than the sensitivity of amorphous wire made using the Taylor process. Further, when constructing a sensing element 10 having amorphous wire 12 made using the Taylor process, a preload or pre-stretch up to about 12 grams is required to eliminate non-responsiveness of the sensing element 10 which occurs when small increases in tension in Taylor wire pre-stretched to a tension less than about 12 grams do not produce a corresponding change in detected peak height. This preload is disadvantageous because pre-stretching of the amorphous wire 12 results in sensor de-calibration for applications where the sensor is deployed for extended periods of time. Use of melt extracted amorphous wire eliminates or significantly reduces this preload requirement. A third benefit of using melt extracted amorphous wire as opposed to Taylor wire is that the melt extracted wire has a higher toleration to stress without de-calibration.

In yet another embodiment, the amorphous wire 12 is constructed using a modified melt spinning process known as "rotating water bath melt spinning" which involves the streaming of a fine jet of molten alloy into a flow of cold water such that the alloy rapidly solidifies and vitrifies. Wire 12 made using this process typically has a diameter of about 80-120 microns and exhibits similar characteristics to melt extracted wire although it is not as sensitive.

Figure 4:
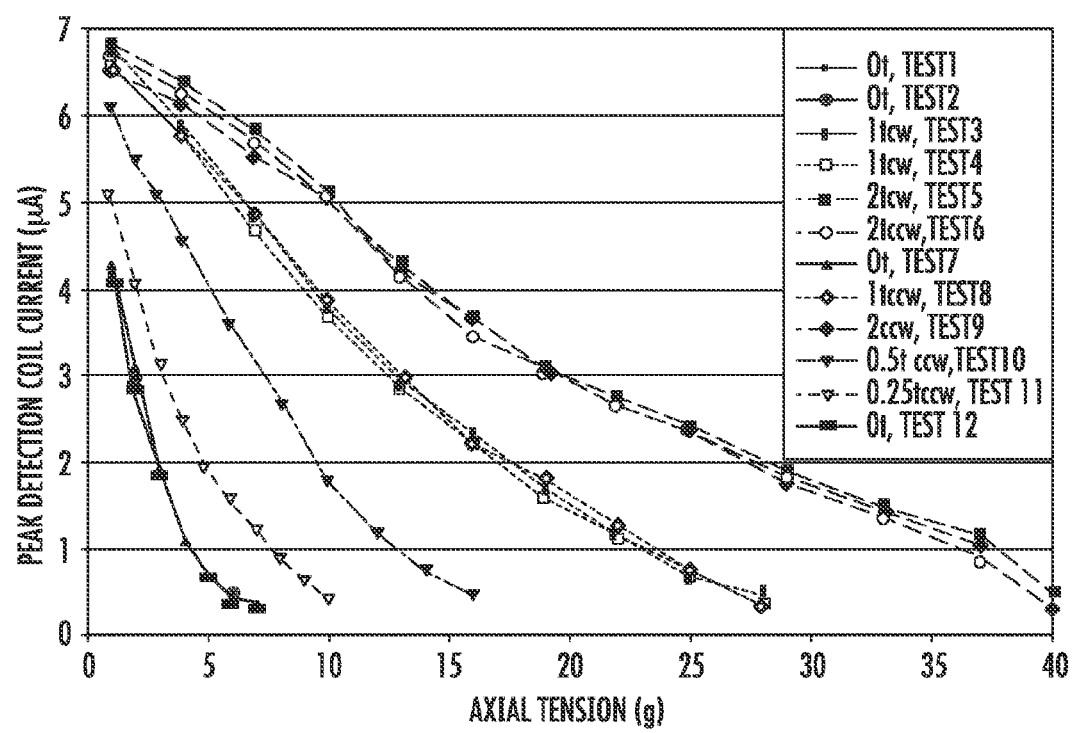
FIG. 4 depicts a series of tests performed on melt extracted amorphous wire subject to varying degrees of tension and twist.

While melt extracted amorphous wire is particularly suitable for use in the sensing element 10 due to its high sensitivity to tension, the wire 12 is also sensitive to twist as shown in the test results of FIG. 4. As shown in FIG. 4, a family of curves for various twists is shown for melt extracted amorphous wire. As indicated in the legend, both clockwise (cw) and counter-clockwise (ccw) tests having movement from zero twist (0t) to two twists (2t) were performed. Solid data points indicate increasing tension of the wire during the particular test while hollow points indicate decreasing tension. As shown, test results were relatively independent of whether tension on the wire is increasing or decreasing and of whether the twist is clockwise or counterclockwise. Further, as more twist was applied to the wire, the greater the sensitivity of the wire became.

Based on the fact that the sensitivity of the melt extracted amorphous wire is dependent on the twist added to the wire as well as tension, the sensing element 10 preferably includes a twisting mechanism used to twist the amorphous wire 12 at one end of the housing 16 relative to the other end of housing 16. Further, an axial load adjustment mechanism is preferably provided that provides for the movement of one end of the wire in an axial direction relative to the other end of the wire. Preferably, the axial load adjustment mechanism is provided on the opposite end of the housing from the twisting mechanism, but it is possible that the twisting and axial load adjustment is accomplished from the same end. Many possibilities exist for manually applying twist and axial tension to the wire 12 including, but not limited to, securing the wire to screws or screw inserts that are configured to move in relation to the housing 16 such that the wire is twisted or axially translated as desired.

Together, the twisting mechanism and axial load adjustment mechanism provide a system for calibrating the sensing element 10. The twisting mechanism applies twist to the wire 12 which changes the sensitivity of the wire 12 as shown in FIG. 4. Calibration requires an iterative process of adjusting both the twist and the axial load of the wire to a setting that produces accurate pressure change detections by the sensing element 10. Further, to eliminate changing the sensitivity of the wire 12 during calibration, the twisting may be performed simultaneously and proportionately to the axial load adjustment.

Figure 5A:
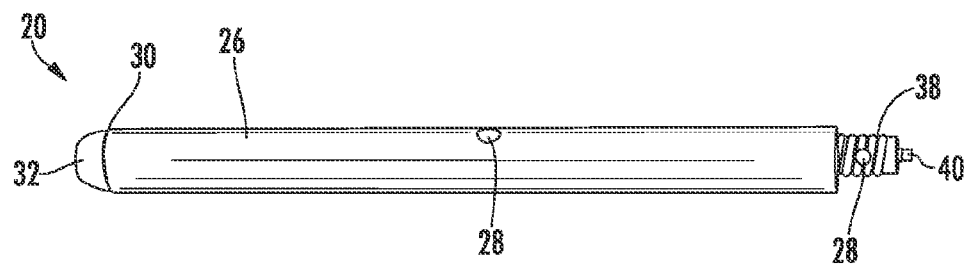
FIG. 5A depicts an assembled sensing element according to one embodiment of the disclosure.
Figure 5B:
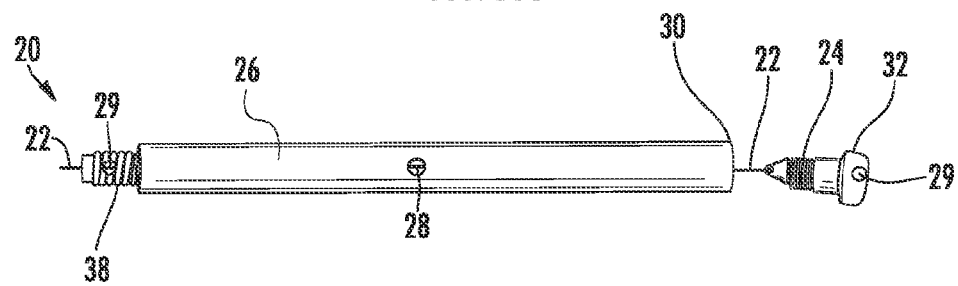
FIG. 5B depicts the unassembled sensing element shown in FIG. 5A according to one embodiment of the disclosure.
Figure 5C:
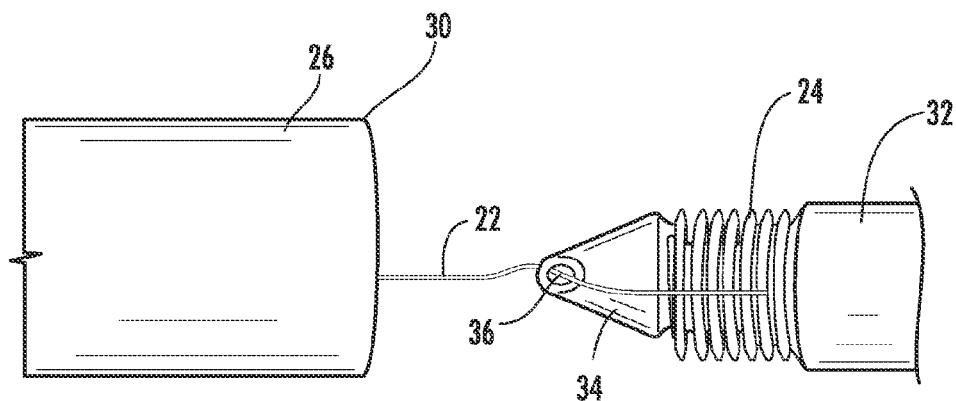
FIG. 5C depicts an exploded view of a press fit insert/twisting mechanism of the sensing element of FIGS. 5A-5C according to one embodiment of the disclosure.

Referring to FIGS. 5A-5C, one embodiment of a sensing element 20 is shown. The sensing element 20 includes an amorphous wire 22 disposed inside and along the axial length of housing 26. As shown in FIG. 5A, the sensing element 20 is comparable in size to a penny and preferably has a length of about 1 to 1.4 inches, an outside diameter of about 0.09 inches, and an inside diameter of about 0.062 inches. The amorphous wire 22 is secured adjacent a first end 30 of housing 26 using insert 32 that is operable to be press fit into the first end 30 of housing 26. As shown in the exploded view of FIG. 5C, bellows 24 is bonded by, for example, an adhesive such as super glue to the insert 32, and the amorphous wire 22 is then secured to the bellows 24. In preferred embodiments, the wire 22 is secured to the bellows 24 using a tapered adapter 34 having through-hole 36. The wire 22 is threaded through the through-hole 36 and bent at a 90° angle and then secured to the bellows 24 using an adhesive. In this particular embodiment, the bellows 24 include about a 0.055 inch outside diameter which allows for about 0.003 inch clearance with respect to the inside diameter of housing 26. However, it should be understood that the particular dimensions of the housing 26 and bellows 24 may vary.

To finish the assembly, the amorphous wire 22 is then threaded through a second end 38 of housing 26 while under a small load of about 1 gram. The wire 22 is secured to the housing, for example by gluing, while under load and any excess wire is trimmed. In order to prevent the wire 22 from slipping and being pulled through the second end 38, a tapered plug 40 as shown in FIG. 5A is preferably pressed into a hole in the second end 38 after adhesive is applied into the hole. In operation, one or more vent holes 28 in the housing 26 allow the pressure inside the sensing element 20 to conform to the surrounding pressure causing the bellows 24 to contract or expand and thereby change the tensile stress in the wire 22.

To provide twisting of the amorphous wire 22 and calibration of the sensing element 22, insert 32 is operable to be rotated in relation to the housing 26. Further, second end 38 is preferably threaded such that it may be screwed into and out of housing 26 to provide axial load adjustments of the wire 22. In other words, the threaded second end 38 adds or removes axial tension on the wire 22 as the end 38 is screwed in or out in relation to the housing 26. Holes 29 in ends 32 and 38 facilitate rotation of the respective ends and enable rotational position of the ends to be determined.

Figure 6:
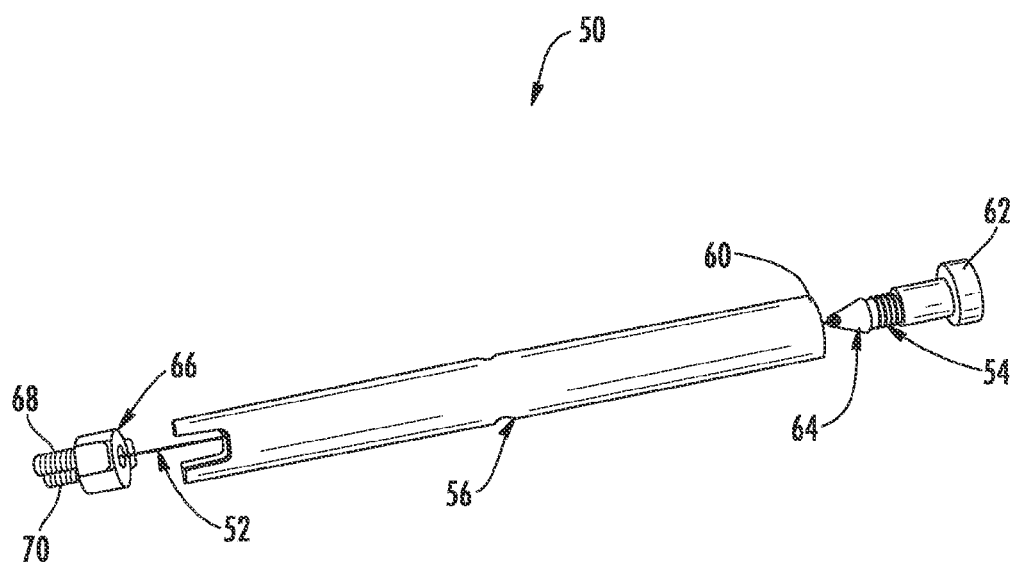
FIG. 6 depicts an unassembled sensing element according to another embodiment of the disclosure.

Referring to FIG. 6, another embodiment of a sensing element 50 is provided. In this embodiment, a first insert 62 having bellows 54 is operable to be inserted into the first end 60 of housing 56. In this embodiment, attachment of the wire 52 to the bellows is accomplished using a small bushing 64. To provide twisting of the wire 52, the first insert 62 is operable to rotate with respect to the housing 56. The opposite end of the wire 52 is threaded through housing 56 and connected to a second insert 66 which provides axial load adjustment of the wire 52 in the housing 56 for adjustment of the offset. As shown in this embodiment, the second insert 66 includes two screws 68 and 70 that provide the axial movement by pressing against housing 56 and changing the axial position of the second insert 66 when the screws 68 and 70 are screwed in or out.

In operation, a sensing element substantially as described above is placed inside a closed system or vessel such that changes in pressure in the system cause the bellows to increase or decrease tension in the wire in proportion to the pressure change. An inducing mechanism is used to induce alternating magnetic domains in the ferromagnetic wire of the sensor, and a detection mechanism is used to detect changes in the switching properties of the ferromagnetic wire as a function of changes in the tensile stress of the wire.

Figure 7:
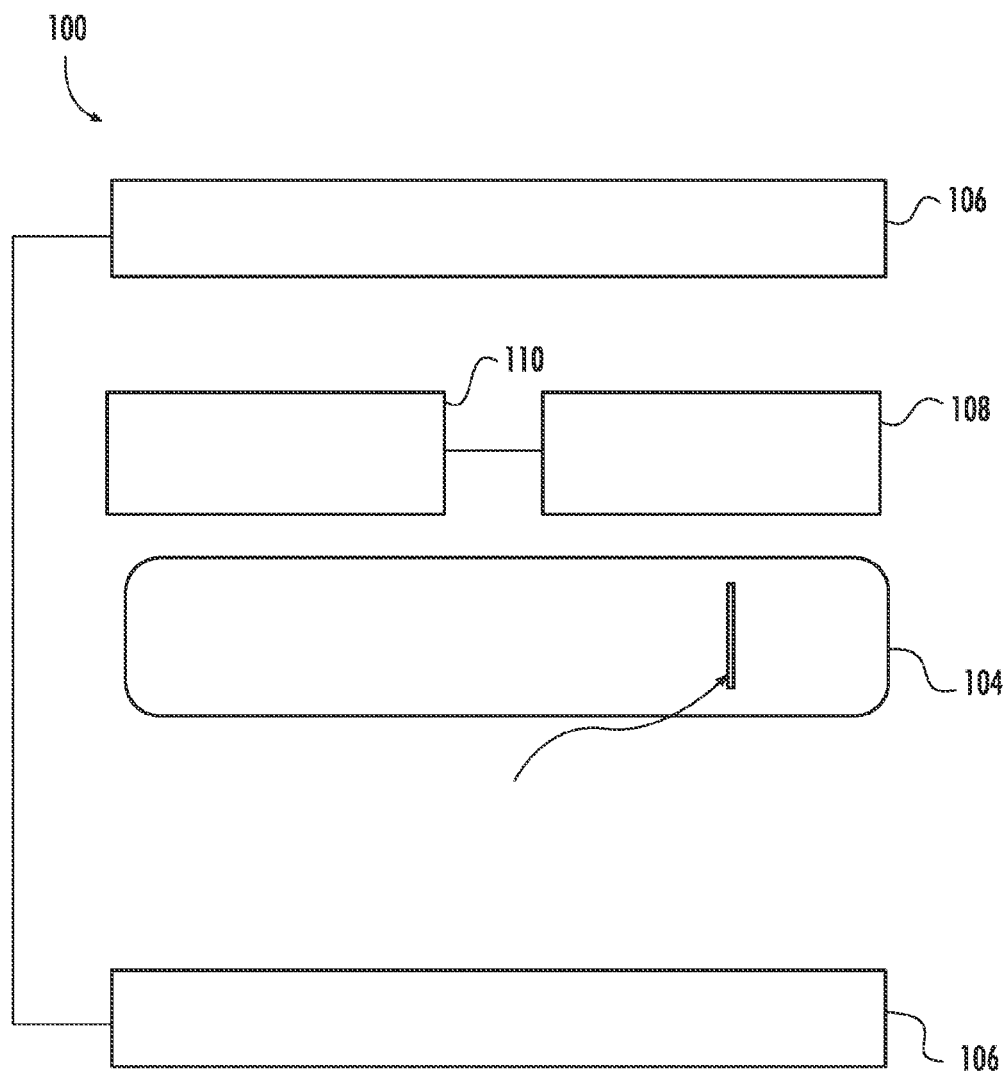
FIG. 7 is a schematic diagram depicting a pressure sensing system including a sensing element and detection mechanism according to one embodiment of the disclosure.

FIG. 7 schematically illustrates a pressure sensing system 100 according to the present disclosure where a sensing element 102 in a closed container 104 or other closed system is detected by a detection mechanism disposed outside the closed container 104 composed of a system of drive coils 106 and pickup coils 108. The sensing element 102 is positioned such that changes in the magnetic field of the sensing element 102 caused by drive coils 106 disposed outside the container 104 are detected by pickup coils 108 also disposed outside the container 104. An alternating current in the drive coils 106 creates the magnetic field, which continually reverses the magnetic domains in the amorphous wire of the sensing element 102. Reversal of the magnetic domains is detected with pickup coils 108 as a peak which changes height based on tensile stress applied to the wire. Cancellation coils 110 having coils wound in a different direction from the pickup coils 108 are provided to detect a similar drive coil magnetic field but does not detect a significant amount of the signal produced by switching of the wire of sensing element 102. The purpose of the cancellation coils is to cancel most of the magnetic field produced by the drive coils 106 and eddy currents caused by the drive fields in conducting objects near the pickup coils 108.

In an alternate embodiment, the sensing element 102, drive coils 106, pickup coils 108, and cancellation coils 110 are housed within a single unit sensor. However, as shown in FIG. 7, the detection mechanism of drive coils 106 and pickup coils 108 are preferably provided in a separate unit from the sensing element 102 to provide for passive pressure sensing in a closed system without the need for a power source or data connection to be connected to the sensing element 102. In embodiments where the detection mechanism is provided in conjunction with the sensing element, a power source and wired or wireless communication means would be required.

Benefits of a pressure sensor such as those described above include the fact that the sensing element is small and inexpensive, can be covertly imbedded in metallic and non-metallic enclosures, and does not require any type of physical power source or wired connection for data transfer. Thus, the sensing element is ideal for situations in which a sealed container cannot be penetrated, such as sealed waste containers. Other potential utilities include, for example, sensing pressure in process vessels and gas cylinders as an indicator of fullness or used to monitor tire pressure without wires for power or data transfer.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A pressure sensor comprising:
   a housing;
   a ferromagnetic metal disposed in the housing;
   a tension inducing mechanism coupled to the ferromagnetic metal, the tension inducing mechanism operable to change a tensile stress upon the ferromagnetic metal based on a change in pressure in the housing; and
   a twisting mechanism operable to twist the ferromagnetic metal in relation to the housing.

2. The sensor of claim 1 wherein the ferromagnetic metal is an amorphous wire.

3. The sensor of claim 2 wherein the amorphous wire is melt extracted.

4. The sensor of claim 2 wherein the amorphous wire is a glass coated Taylor wire.

5. The sensor of claim 2 wherein the amorphous wire is composed of a cobalt and iron based alloy.

6. The sensor of claim 1 wherein the tension inducing mechanism includes bellows.

7. The sensor of claim 1 wherein the twisting mechanism includes an insert sized and configured for insertion in a first end of the housing and operable to be rotated in relation to the housing, the ferromagnetic metal being secured to the insert such that the ferromagnetic metal is twisted when the insert is rotated.

8. The sensor of claim 7 wherein the insert includes the tension inducing mechanism and a tapered adapter having a through-hole, the ferromagnetic metal being threaded through the through-hole of the tapered adapter and secured to the tension inducing mechanism.

9. The sensor of claim 1 further comprising an axial load adjustment mechanism for providing manual adjustments of the tensile stress of the ferromagnetic metal.

10. The sensor of claim 1 further comprising a detection mechanism, the detection mechanism including:
    an inducing mechanism to induce alternating magnetic domains in the ferromagnetic metal; and
    a detection mechanism to detect changes in magnetic switching characteristics of the ferromagnetic metal caused by the inducing mechanism and changes in the tensile stress of the ferromagnetic metal caused by the change in pressure in the housing.

11. A method of determining pressure in a closed system comprising:
    providing a sensor element inside the closed system, the sensor element including a ferromagnetic metal and a tension inducing mechanism coupled to the ferromagnetic metal, the tension inducing mechanism operable to change a tensile stress upon the ferromagnetic metal based on a change in pressure in the closed system;
    subjecting the ferromagnetic metal to an alternating magnetic field; and
    detecting a change in magnetic switching characteristics of the ferromagnetic metal which varies as a function of tensile stress in the ferromagnetic metal.

12. The method of claim 11 wherein the subjecting the ferromagnetic metal to the alternating magnetic field and detecting the change in magnetic switching characteristics steps are performed by a detection mechanism disposed outside the closed system.

13. The method of claim 12 wherein there is no wired connection between the sensor element and the detection mechanism during the subjecting the ferromagnetic metal to the alternating magnetic field and detecting a change in magnetic switching characteristics steps.

14. The method of claim 11 further comprising twisting the ferromagnetic metal in the sensor element, and wherein the change in magnetic switching characteristics of the ferromagnetic metal varies as a function of tensile stress and twist in the ferromagnetic metal.

15. The method of claim 11 wherein the ferromagnetic metal is an amorphous wire.

16. The method of claim 15 wherein the amorphous wire is melt extracted.

17. The method of claim 15 wherein the amorphous wire is a glass coated Taylor wire.

18. The method of claim 15 wherein the amorphous wire is composed of a cobalt and iron based alloy.

19. The method of claim 11 wherein the tension inducing mechanism includes bellows.

* * * * *